July 5, 1960
G. PINTER ET AL
2,943,643
FLOW MODULATING DEVICE
Filed Dec. 21, 1956
2 Sheets-Sheet 1
FIG. 2
FIG. 1
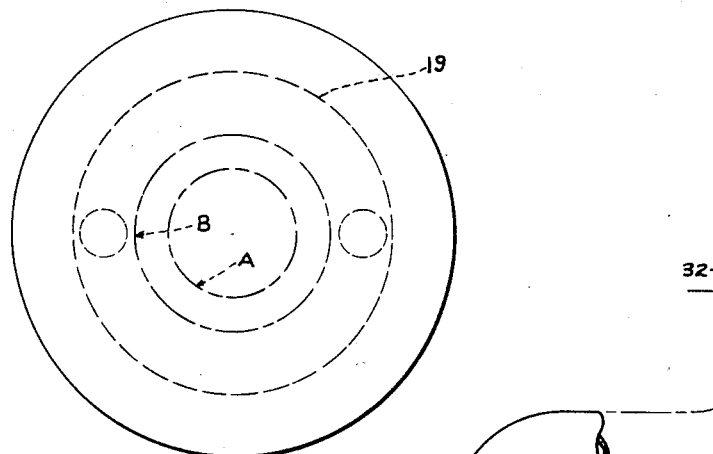
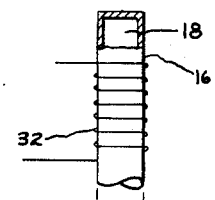
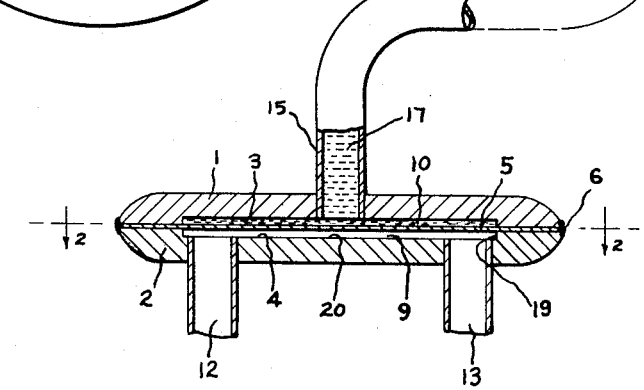
FIG. 3
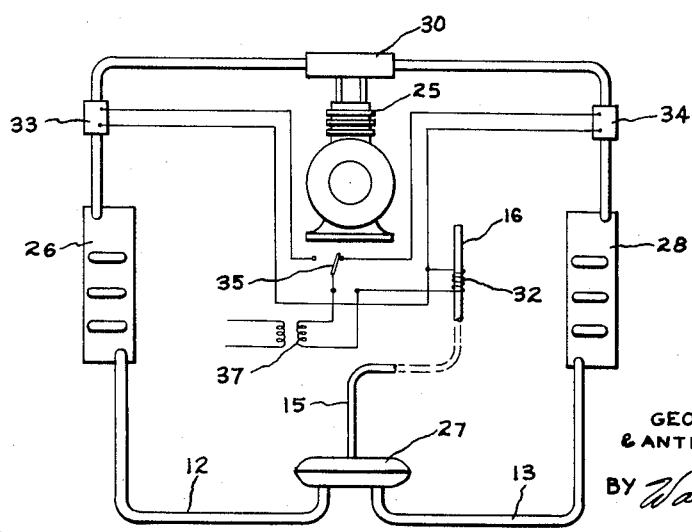
INVENTORS
GEORGE PINTER
& ANTHONY F. CHEREIH
BY *Walter Kule*
THEIR ATTORNEY

*INVENTOR.*
GEORGE PINTER
& ANTHONY F. CHEREIH

BY *Walter E. Hule*

THEIR ATTORNEY

United States Patent Office 2,943,643
Patented July 5, 1960

2,943,643
FLOW MODULATING DEVICE

George Pinter, Irvington, and Anthony F. Chereih, East Orange, N.J., assignors to General Electric Company, a corporation of New York
Filed Dec. 21, 1956, Ser. No. 629,939
2 Claims. (Cl. 138—46)

The present invention relates to a flow modulating or control device and is more specifically concerned with a device of this type particularly adapted for use in controlling the flow of refrigerant in a refrigerating system.

Flow control devices to meter the flow of refrigerant from the condenser to the evaporator of a refrigerating system form an essential and critical part of practically every refrigeration apparatus. Expansion valves, float valves and capillary tubes are most frequently used. The usual expansion valves and float valves are highly sensitive devices, manufactured to close tolerances, so that they are relatively expensive and usually require considerable servicing and adjustment. However, when properly used, they provide excellent flow modulation over a wide range of operating conditions. Capillary tubes on the other hand are simple, inexpensive devices and can be matched for a relatively narrow band or range of operating conditions to maintain as good or even better flow control than the usual expansion and float valves do. However, they usually fail to follow the modulating requirements of a system over a wide range of operating conditions.

It is an object of the present invention to provide a new and improved flow modulating device which is of simple and inexpensive construction and which is particularly adapted for controlling the flow of refrigerant in a refrigerating system.

Another object of the invention is to provide a flow modulating device having many advantages and characteristics of the capillary tube but including simple means for modulating the flow of refrigerant through the device in response to a wide range of operating conditions of a refrigerating system.

Further objects of the invention will become apparent as the following description proceeds and the features of novelty which characterize the invention will be pointed out with particularity in the claims annexed to and forming a part of this specification.

In carrying out the objects of the present invention there is provided a flow control device for controlling fluid flow essentially comprising two relatively flat and parallel members defining a flow restricting fluid passage. At least one of the members is flexible and forms one side or wall of a relatively wide and thin restricted fluid passageway. Its periphery is supported in fixed relationship with the adjacent surface of the other member which forms the opposite wall or side of the fluid passage. The flexible member provides means for modulating or varying the flow by changing the restriction of the passage in that the unsupported portions thereof can move relative to the opposite member to increase or decrease the effective thickness and cross sectional area of the passageway and thereby vary the flow restriction of the device. In its preferred form, the flow control device consists essentially of two relatively rigid body members having flat parallel opposed face portions and a flexible diaphragm member sandwiched between the body members in contact with these face portions. The rigid body members and diaphragm are co-extensive and fixedly connected at their peripheries. At least one of the body members includes a depression in the face thereof of an area sufficient to permit flexing of the opposed portion of said diaphragm relative to the other body member while the second body member has spaced fluid inlet and outlet passages therein terminating on the face portion thereof opposite the depression and at points adjacent the periphery of the depression. The space between the flexible portion of the diaphragm and the face of the second body member forms a relatively wide and thin restricted passage for a fluid whose flow is to be controlled while the chamber formed by the diaphragm and the walls of the depression in the first body member provides means for the application of a variable fluid pressure on the diaphragm in order to regulate the position of the diaphragm and hence the restrictive effect of the passage.

For a better understanding of the invention reference may be had to the accompanying drawings in which:

Fig. 1 is a view partially in section of one embodiment of the flow modulating device of the present invention;

Fig. 2 is a sectional view along line 2—2 of Fig. 1;

Fig. 3 is a diagrammatic representation of a reversible refrigerating system illustrating the manner in which the flow modulating device of the present invention can be incorporated into such a system.

Figure 4:
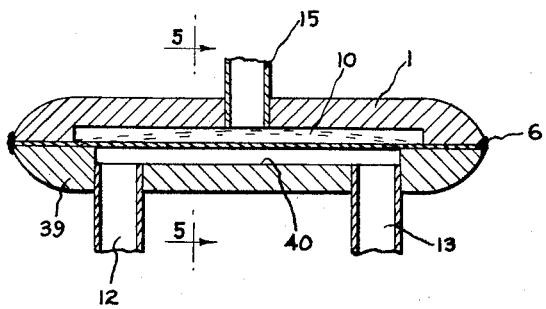
Figs. 4–7 inclusive are sectional views of various other modifications of the flow modulating device of the present invention.

Referring to the drawings and more particularly to Fig. 1 thereof, there is shown one embodiment of the flow modulating device of the present invention comprising two substantially identical disk-shaped rigid body members 1 and 2 which together form the body of the flow modulating device. In this modification both of the members 1 and 2 are provided on one face thereof with shallow depressions 3 and 4. These disk-shaped members 1 and 2 are assembled with the depressions 3 and 4 facing one another and a disk or diaphragm of flexible material 5 such as steel or Phosphor-bronze, is interposed or sandwiched between the two members 1 and 2. Members 1 and 2 and the interposed flexible member 5 are joined together at their adjacent peripheral edge portions. A common welded or brazed seam indicated generally by the numeral 6 is preferably used for this purpose.

As will be evident from a consideration of Fig. 1 of the drawing, this structure provides two chambers 9 and 10 formed respectively by the depressions 4 and 3 and the interposed diaphragm or flexible member 5. One of these two chambers serves as a restricting and modulating fluid flow passage while the other provides means for changing the effective cross section of the passage to modulate the fluid flow through that passage. In the illustrated modification, the chamber 9 forms a fluid flow passage for fluid between an inlet 12 provided adjacent the peripheral edge of the chamber 9 and an outlet 13 spaced from the inlet 12 and also positioned adjacent the peripheral edge of the chamber 9. The other chamber 10 forms part of a control means including a conduit 15 connecting the chamber 10 to a control bulb 16, all of which are filled with a charge of suitable control fluid. Preferably the charge is a two-phase fluid with a liquid phase 17 filling most of the device and a vapor phase 18 present in the sensing bulb 16. Also the charge desirably has a higher boiling point than the fluid, such as a liquid refrigerant, whose flow is being modulated or controlled to avoid any condition in which control of the device is effected by the ruling temperature at the diaphragm rather than by the bulb temperature.

In the operation of the flow modulating device, as described hereinabove, the chamber or passage 9 functions in much the same manner as the usual capillary tube if its flexible member is thought of as being fixed or frozen in one position. In other words it provides the normal flow restriction for liquid entering at the tube 12 and leaving at the tube 13 or vice versa. In practice, the chamber or passage 9 in this embodiment is so constructed that the effective cross sectional area of the passage 9 with the normal operating pressures on the two sides of the diaphragm 5 will provide maximum flow conditions or minimum restriction over the range of operating conditions for the specific application of the flow modulating device. In other words the size of the depression 4 and the depth of that depression as determined in Fig. 1 by the height of the wall 19, which maintains the peripheral edges of the diaphragm 5 in spaced relationship with the bottom wall of the depression or cavity 4, provide a relatively thin, relatively wide restricting passageway for fluid entering the passageway through the inlet 12 of an effective cross-section designed to provide the desired maximum flow condition.

A decrease in the rate of fluid flow through this modification of the invention is obtained by application of increased pressure on disk or diaphragm 5 by the charge within the chamber 10 whereby the unsupported flexible central portions of the diaphragm 5 are urged downwardly towards the opposite wall 20 of the passage 9 and into contact with that wall over an area which varies with the pressure applied.

This operation of the flow modulating device can best be understood from a consideration of a refrigerating system including the device as a means for restricting the flow of refrigerant between a condenser and an evaporator. Such a system, in the form of a heat pump, is shown in Fig. 3 as including a compressor unit 25, a first heat exchanger 26, the flow modulating device of the present invention generally indicated by the numeral 27 and a second heat exchanger 28 connected in closed series connection. As the particular system illustrated in Fig. 3 is designed for operation with either of the heat exchangers 26 and 28 operating as an evaporator and the other as a condenser, a reversing valve 30 is provided for directing the flow of compressed refrigerant from the compressor 25 to either of the heat exchangers. When the heat exchanger 26 is operating as a condenser and the exchanger 28 as an evaporator, refrigerant is conducted through the reversing valve 30 to the heat exchanger 26 where it is condensed. The condensed or liquid refrigerant then flows through the flow modulating device 27 to the lower pressure side of the system including the evaporator 28. From the evaporator 28 the gaseous refrigerant is returned to the compressor 25.

It is well known that the optimum operating conditions for a refrigerating system do not remain fixed and depend upon a number of factors. It is highly desirable therefore that any flow control device be adapted to provide such optimum operating conditions. One of these conditions involves the load on the evaporator and, while the flow modulating device of the present invention can be made responsive to any variable system condition, its operation will be described with specific reference to the control of an evaporator condition and more specifically to the control of the flow of refrigerant to maintain a substantially zero superheat condition at the outlet of the evaporator. Such condition exists if the addition of any limited amount of heat to the bulb 16 of the modulating system causes the refrigerant leaving the evaporator to superheat.

In the application of the flow modulating device of the present invention to control this evaporator condition, the passage 9 is so dimensioned as to provide the maximum desired refrigerant flow. In other words it is designed to give a positive minimum flow restriction under those operating conditions in which all of the surface of the respective heat exchanger functioning as the evaporator is used for the evaporation of refrigerant and the refrigerant leaving that heat exchanger has for all practical purpose been completely vaporized. This condition is termed here as the "zero superheat" condition.

There is also provided an electrical control system including a resistance heater 32 in heat exchange relationship with the bulb 16 and devices 33 and 34 adapted to sense and control evaporator condition such as zero superheat and respectively arranged in heat exchange relationship with the conduits or with the refrigerant flowing through the conduits connecting the compressor 25 with the outlets of heat exchangers 26 and 28. By means of switch 35 either of the sensing devices 33 or 34 can be placed in the circuit with the heater 32 and a source of power exemplified by the secondary winding 37 of a transformer. The sensing devices 33 and 34 are adapted to energize or change the energization of the resistance heater 32 depending upon the requirement of the evaporator control point as sensed by the sensing device 33 or 34. For example, when the heat exchanger 28 is functioning as the evaporator, the sensing device 34 is connected by means of the switch 35 to the heater 32 and the power source 37. If the refrigerant condition sensed by the sensing means 34 indicates a flooding through the evaporator, the sensing means increases the flow of current to the heater and the increased energy supplied to the heater 32 causes the charge within the bulb 16 to expand and increase the pressure on diaphragm 5. This pressure causes the diaphragm 5 to move towards or into contact with the wall 20 of the flow modulating passage 9 to decrease the flow of refrigerant through the device.

This action of the diaphragm is best illustrated in Fig. 2. Since the unsupported central portions of the diaphragm 5 are free to move and since the diaphragm 5 is spaced only a short distance from the wall 20 as compared with its overall area or diameter, the diaphragm or movable wall member 5 is, upon an increased pressure within the chamber 10, forced to move downwardly so that a central portion represented in Fig. 2 by a circle A contacts the wall 20. Further increase in the control pressure within the chamber 10 effects a further depression or flexing of the diaphragm until a larger area represented generally by the circle B contacts the fixed wall 20. The result in each case is a decrease in the effective cross sectional area of the total passageway between the inlet 12 and the outlet 13 and specifically the formation of longer parallel paths passageways due to the fact that the flow of refrigerant from the inlet 12 to the outlet 13 is forced more and more towards two semi-circular paths along the peripheral wall 19 of the enclosure 9. Again, when the device 34 senses that superheated refrigerant is leaving the evaporator 28, the energization of the heater 32 is diminished thus reducing the pressure within the chamber 10 and permitting the diaphragm 5 to move in a direction away from the fixed wall 20.

While the invention is not restricted to any specific relationship or ratio between the normal space between the flexible wall 5 and the fixed wall 20 and the diameter of the depressions 3 and 4, which dimensions determine the operable area of the flexible wall 5, it has been found that best results are obtained when this ratio is between 1:50 and 1:200.

In some applications of the flow control device of the present invention, as for example in the use thereof as a flow control means on a heat pump in which defrosting of the evaporator coil is effected by reversing the refrigerant flow through the system, the differences between the control pressure and the pressure of the refrigerant within the passageway 9 may at times be so great that for all practical purposes, the device chokes off the refrigerant flow completely or substantially at the beginning of such defrosting operation.

To overcome this difficulty on the defrost cycle, there is provided in accordance with the following modifications, a capillary bypass which permits a limited flow of refrigerant regardless of the extreme differences between the control pressure and the refrigerant pressure within the device.

Figure 5:
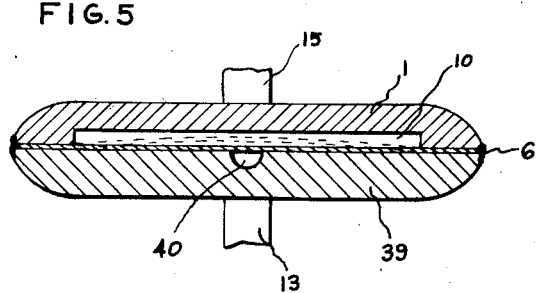

One modification of the invention designed to provide this bypass arrangement is shown in Figs. 4 and 5 of the drawing in which the same reference numerals are used to designate parts which are the same as or similar to those of the device of Fig. 1. In this modification of the invention the upper body member 1 includes the control fluid chamber 10 above the diaphragm 5 and is structurally the same as the body member shown in Fig. 1 of the drawing. The lower body member 39 on the other hand may differ somewhat in construction in that the face thereof contacting the diaphragm 5 can be made flat across its entire surface so that the diaphragm 5 in its relaxed position with no refrigerant flow through the device will contact the upper face of the lower body member 39 over substantially its entire area. In order to provide for a minimum flow of refrigerant under all conditions, as for example at the beginning of the defrost operation, the body member 39 is provided with a groove 40 extending across the face thereof at least between the inlet and outlet passageways 12 and 13 which with the diaphragm forms a minimum flow capillary passage.

In the operation of the modification shown in Figs. 4 and 5 of the drawing, when the control pressure within the chamber 10 is high as compared with the pressure of refrigerant passing between the passages 12 and 13, the diaphragm 5 lies flush with the cooperating face of the lower body member 39 and the only refrigerant flow is substantially through the groove 40. On the other hand when the control bulb 16 responds to an evaporator outlet temperature above zero superheat, the sensing device 33 or 34 is designed to control heat input to heater 32 in such a manner that the control fluid pressure within the chamber 10 is lowered so that the diaphragm 5 can be flexed upwardly to the dotted line position shown in Fig. 4 by the pressure of the refrigerant in the system to permit the passage of an increased quantity of refrigerant through the device until the desired evaporator outlet conditions have again been obtained.

Figure 6:
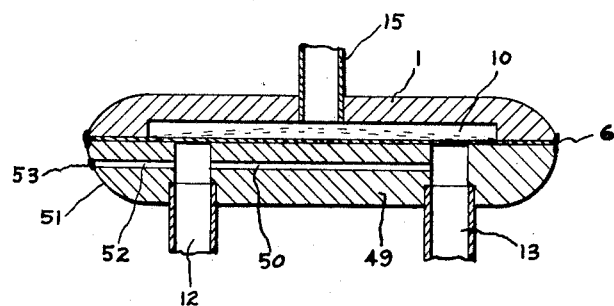

In the modification of the invention shown in Fig. 6 of the drawing, the bypass means corresponding to the groove 40 of the modification shown in Fig. 4 comprises a capillary bypass extending part way through the rigid body member 49 between the inlet passage 12 and the outlet passage 13. Conveniently, this capillary bypass 50 may be formed by drilling a small hole from the one side 51 of the body member 49 through the first passage 12 to a point communicating with the second passage 13. Thereafter that portion of the drilled hole between the side 51 and passage 12, which is indicated generally by the numeral 52, is closed by a brazing or similar operation as indicated by the numeral 53. This can conveniently be done at the same time that the upper and lower body members 1 and 49 and the diaphragm 5 are brazed or welded together at their peripheries. As will be seen from comparison of the modifications of Figs. 4 and 6, the operation of the device as illustrated in Fig. 6 is substantially the same as that of the Fig. 4 device, the drilled bypass 50 functioning in the same manner as the groove 40 to provide a minimum flow under any extreme condition.

Figure 7:
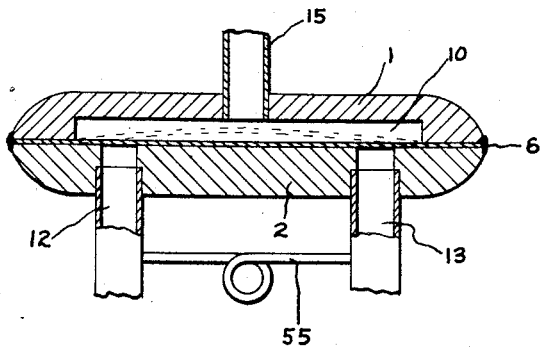

Fig. 7 illustrates a further modification of the invention in which the minimum flow function performed by the groove 40 or the drilled passage 50 is performed by a capillary 55 between the inlet and outlet passages 12 and 13, the capillary 55 being provided exterior of the control device proper and, of course, connected into the system in parallel with the control device.

From the above description it will be seen that there has been provided in accordance with the present invention a rugged, inexpensive and easy to assemble flow modulating device which combines many of the advantages of the fixed restrictor or capillary tube type of flow control and of the usual expansion valve. It differs from these devices in that it is primarily a flow restricting means functioning much like a capillary tube but because of the fact that at least one of the walls of the flow controlling passage is flexible and capable of movement relative to the opposite wall, a substantial degree of flow modulation can be obtained in response to a change in a condition of operation of the system. None of the springs and other moving parts normally found in the usual expansion valves are required and the only moving part is the flexing portion of the diaphragm. For proper operation it is, of course, essential that the dimensions of the flexible portion of the diaphragm be such that the diaphragm or wall is capable, under the application of a differential fluid pressure, of moving relative to the opposed fixed wall to such an extent as to provide the desired flow modulation.

It will also be obvious that the invention is not restricted to a flow modulating device in which the free or flexible portion of the diaphragm has any particular configuration or shape. However, best results are obtained when the depression defining the flexing portion of the diaphragm is of a circular or substantially circular shape.

It is also to be understood that the present invention is not restricted to any particular modification and it is intended by the appended claims to cover all modifications within the spirit and scope of the present invention.

What we claim as new and desire to secure by Letters Patent of the United States is:

1. A flow control device consisting essentially of a pair of relatively rigid body members and a flexible metal diaphragm sandwiched between said members, each of said members having side and flat bottom walls defining a circular depression in the surface thereof facing said diaphragm, one of said members having diametrically spaced fluid inlet and outlet connections terminating in and adjacent the periphery of the depression in said one of said members, said depressions being substantially coextensive and of an area sufficient to provide for flexing of the unsupported central portion of the diaphragm between said depressions into contact with the bottom wall of the depression in said one of said members to restrict the flow of fluid from between said inlet and outlet connections to paths extending only along the periphery of the depression in said one of said members.

2. A flow control device for modulating fluid flow comprising a pair of relatively rigid body members and a flexible metal diaphragm sandwiched between said members and fixedly connected thereto adjacent the periphery thereof, at least one of said members having side and bottom walls defining a substantially circular depression in the surface thereof facing said diaphragm and having a depth-to-diameter ratio of from 1:50 to 1:200, said one of said members having diametrically spaced fluid inlet and outlet connections communicating with said depression adjacent the periphery of said depression, said depression and one face of the section of said diaphragm overlying said depression forming a fluid flow passage between said inlet and outlet connections, and means for flexing the section of said diaphragm overlying said depression to bring the center portion of said diaphragm section into contact with bottom wall of said depression thereby restricting the fluid flow between said inlet and outlet connections to two arcuate paths extending along the periphery of said depression.

References Cited in the file of this patent

UNITED STATES PATENTS

| | | |
|---|---|---|
| 978,288 | Harkom | Dec. 13, 1910 |
| 1,730,150 | Keith | Oct. 1, 1929 |
| 1,956,268 | Brady | Apr. 24, 1934 |
| 2,128,050 | Landis | Aug. 23, 1938 |
| 2,229,038 | Booth | Jan. 21, 1941 |
| 2,618,458 | Fosbender | Nov. 18, 1952 |
| 2,629,399 | Kulick | Feb. 24, 1953 |
| 2,648,291 | Moller | Aug. 11, 1953 |
| 2,796,886 | Whitlock | June 25, 1957 |
| 2,856,148 | Heathcote | Oct. 14, 1958 |